US010023252B1

(12) United States Patent
Bjone

(10) Patent No.: US 10,023,252 B1
(45) Date of Patent: Jul. 17, 2018

(54) INTERMODAL CONTAINER WITH CHASSIS

(71) Applicant: Amazon Technologies, Inc., Seattle, WA (US)

(72) Inventor: Nicholas Bjone, Laveen, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/499,288

(22) Filed: Apr. 27, 2017

(51) Int. Cl.
| | |
|---|---|
| *B62D 63/06* | (2006.01) |
| *B65D 88/12* | (2006.01) |
| *B65D 90/00* | (2006.01) |
| *B65D 88/02* | (2006.01) |

(52) U.S. Cl.
CPC ........... *B62D 63/06* (2013.01); *B65D 88/022* (2013.01); *B65D 88/121* (2013.01); *B65D 90/008* (2013.01)

(58) Field of Classification Search
CPC ...... B62D 21/00; B62D 21/18; B62D 33/027; B62B 33/04
See application file for complete search history.

(56) References Cited

U.S. PATENT DOCUMENTS

| | | | | |
|---|---|---|---|---|
| 5,050,897 A | * | 9/1991 | Stromberg | ........... B62D 53/067 280/43 |
| 8,282,110 B2 | * | 10/2012 | Schubert | ................ B65D 90/22 280/43 |
| 9,127,872 B1 | | 9/2015 | Chainey | |

* cited by examiner

*Primary Examiner* — John D Walters
*Assistant Examiner* — James J Triggs
(74) *Attorney, Agent, or Firm* — Baker & Hostetler LLP

(57) ABSTRACT

In one embodiment, an intermodal container comprises a metal box, and left and right wheel assemblies. The box includes a front wall, a rear door opposite the front wall along a longitudinal direction, first and second sidewalls that oppose one another along a lateral direction, a top wall, a bottom wall that opposes the top wall along a vertical direction, and a structural frame. The left and right wheel assemblies are spaced from one another along the lateral direction. Each one of the wheel assemblies includes an axle and at least one tire mounted on the axle. The wheel assemblies are movable between an extended position in which the tires extend below the first and second sidewalls in the vertical direction so as to be engageable with a ground surface, and a retracted position in which the first and second sidewalls extend below the tires along the vertical direction.

21 Claims, 6 Drawing Sheets

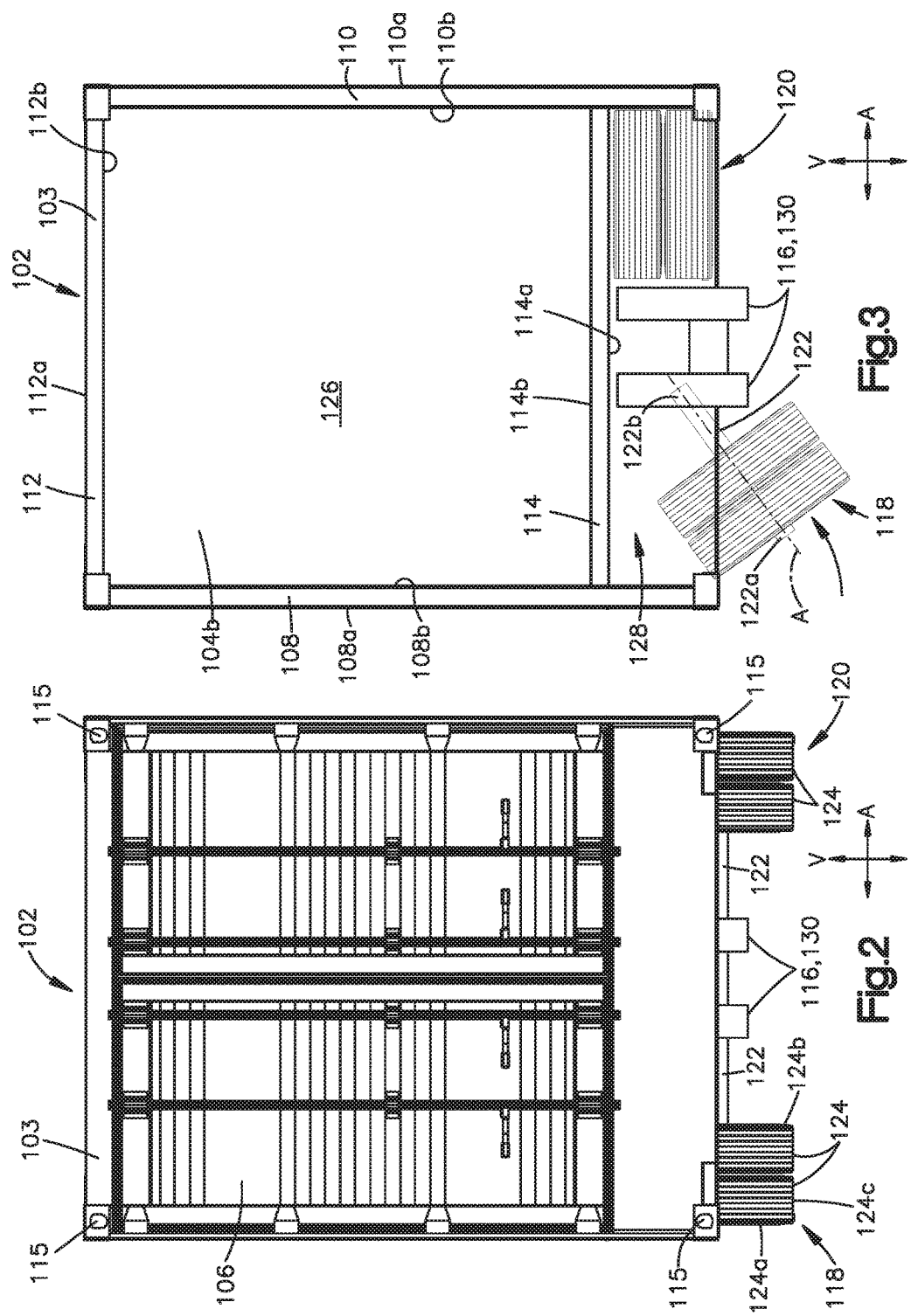

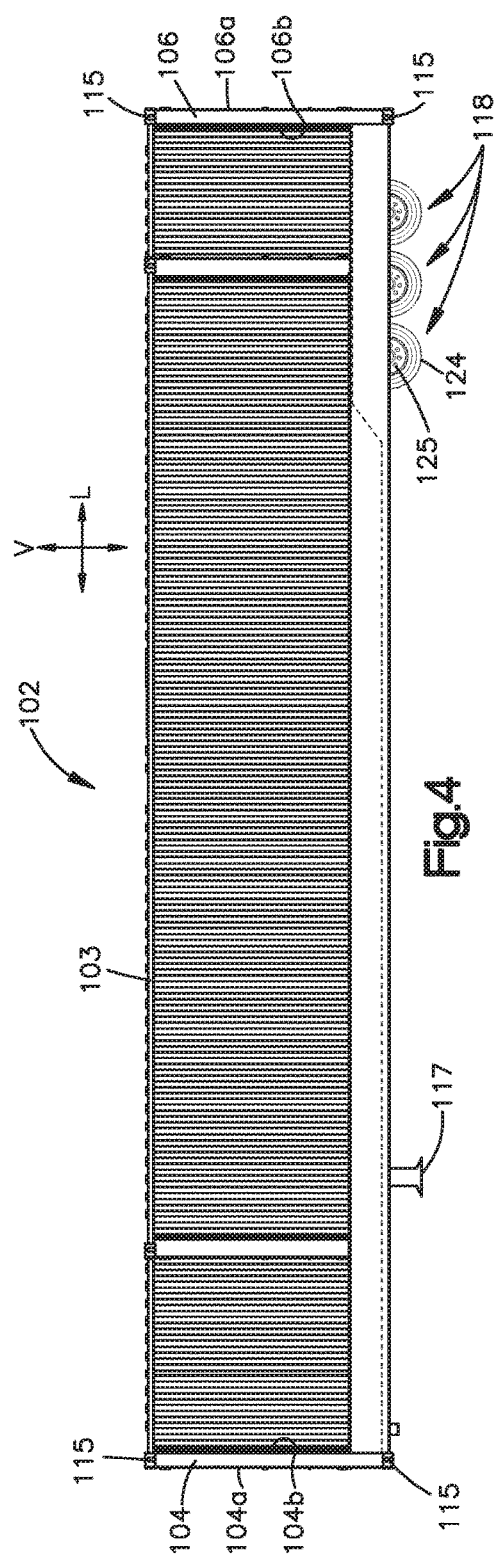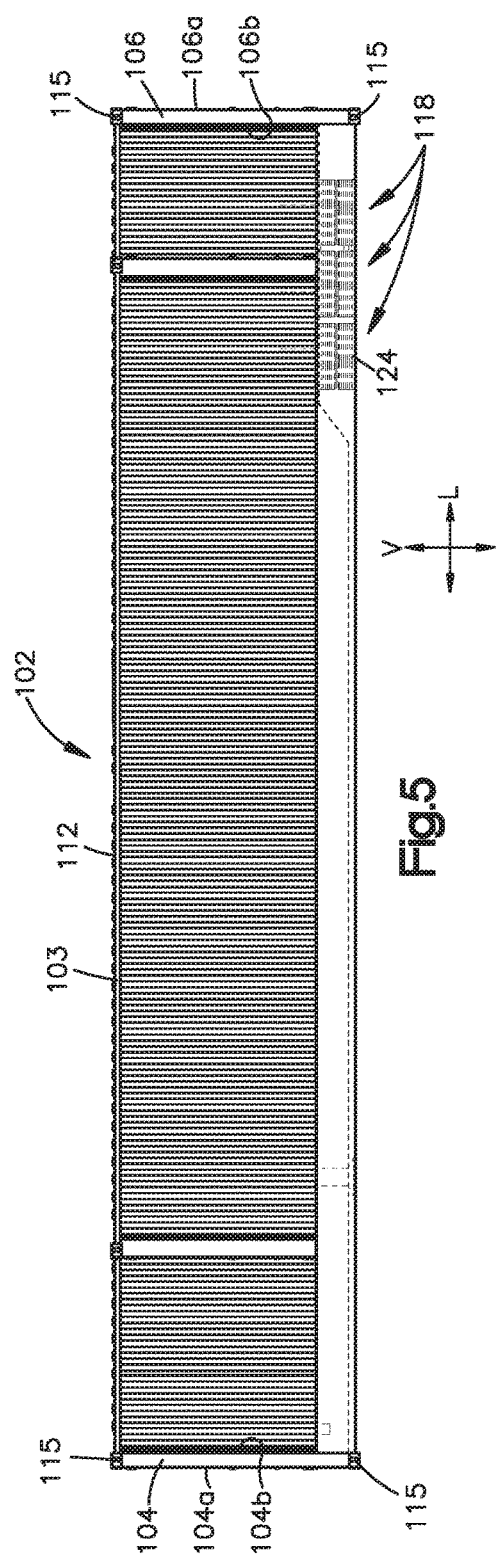

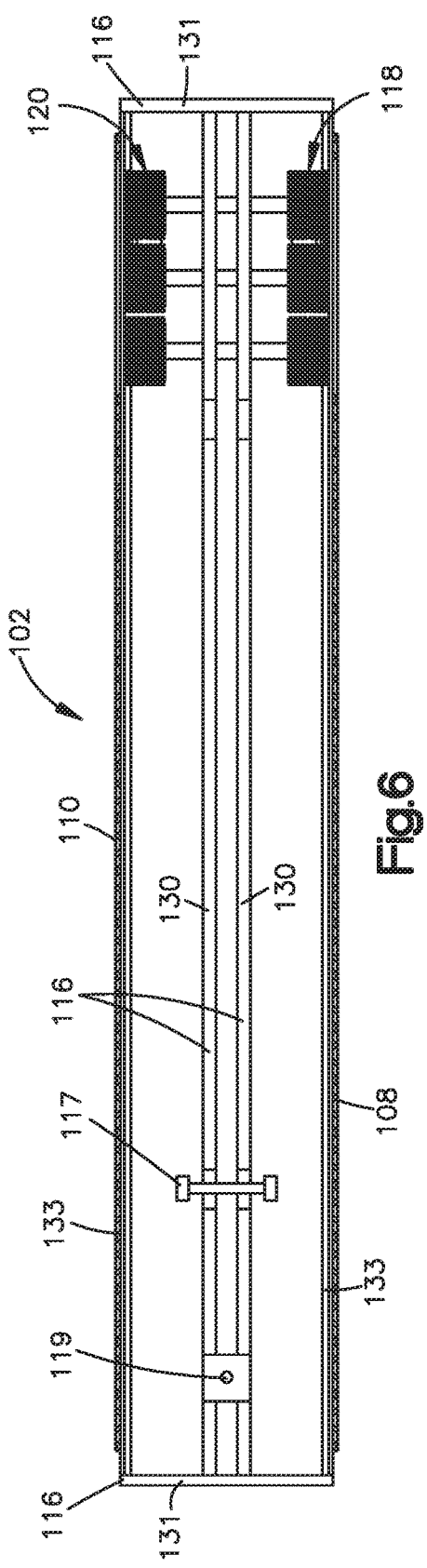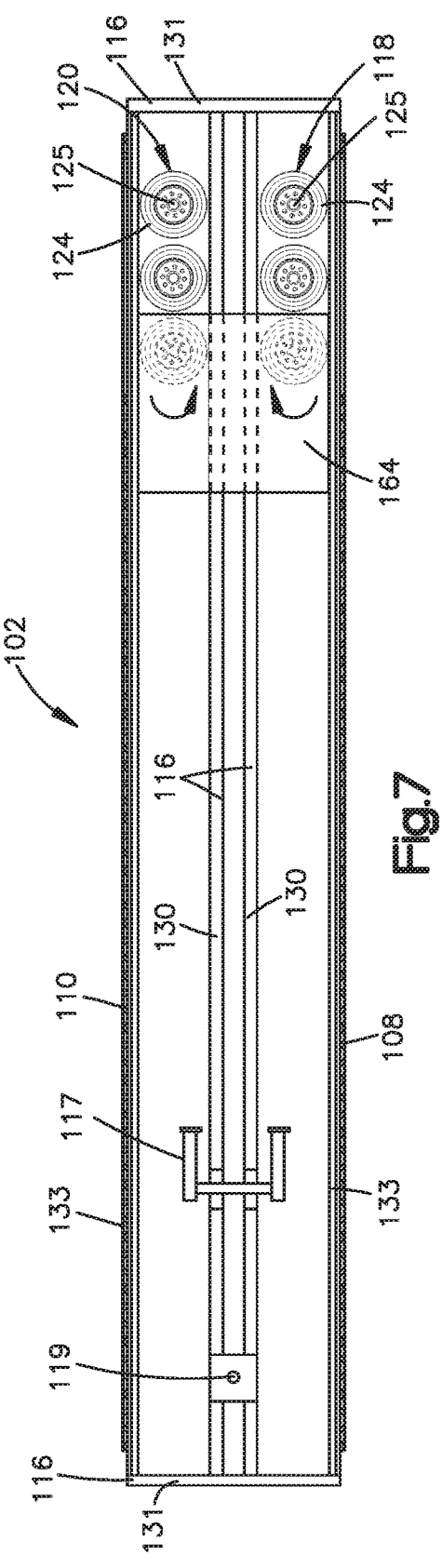

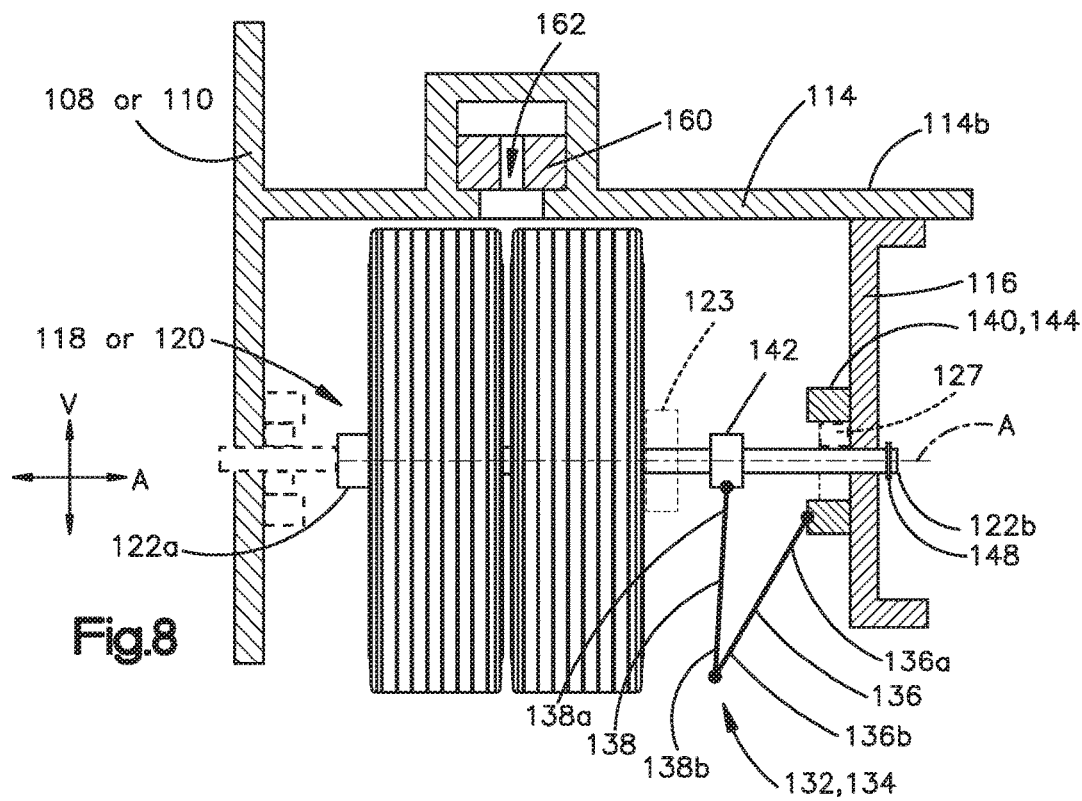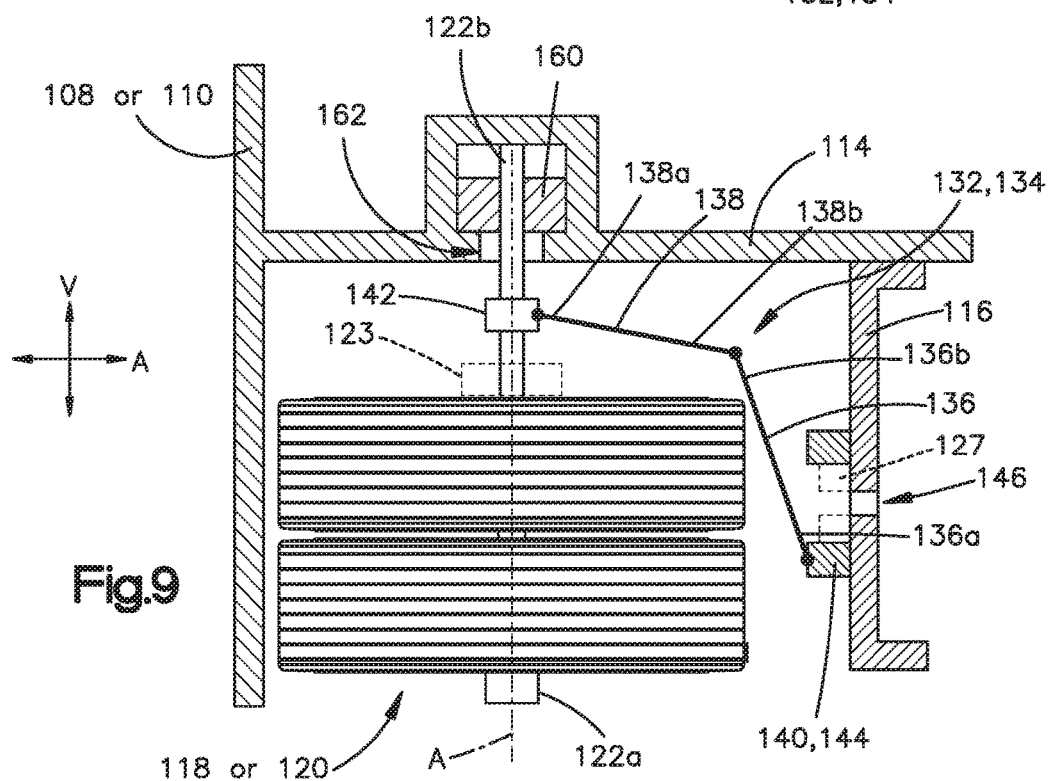

INTERMODAL CONTAINER WITH CHASSIS

BACKGROUND

Intermodal freight transport is a system of transporting intermodal containers by truck, rail, and ship. Most intermodal containers are governed by the International Standards Organization (ISO), and most containers are 8 feet wide and between 8.5 feet and 9.5 feet high. The most common lengths are 20 feet, 40 feet, 45 feet, 48 feet, and 53 feet (16 m), although other lengths exist.

Intermodal containers are carried on ships by stacking one on top of another, often as high as seven containers high. On trucks, the containers are carried on a chassis or semi-trailer, which is pulled by a tractor unit. The container is locked onto the chassis by twist locks, and the chassis is connected to the tractor unit by a fifth wheel hitch. On trains, the containers may be "single stacked" onto the bed of a train car (referred to as container on flatcar (COFC)), stacked one on top of another in a "double-stack" configuration, or the chassis with intermodal container may be loaded onto the bed of the train car (referred to as trailer on flatcar (TOFC)).

In practice, for example, a container may be loaded with goods and the container may be loaded onto a chassis. A truck conveys the container on the chassis to a rail terminal, where the container is lifted by one of several types of cranes onto a train car for conveying it efficiently over a long distance. The container may be offloaded onto a truck for a final trip (often referred to as drayage) to its final destination or for a trip to an ocean port, where the container is removed from the chassis and loaded onto a ship.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 2 shows a rear view of the intermodal container of FIG. 1 with left and right wheel assemblies in the extended position;

FIG. 3 shows a cross-sectional rear view of the intermodal container of FIG. 1 with a left wheel assembly transitioning to a retracted position and a right wheel assembly in a retracted position;

FIG. 4 shows a side view of the intermodal container of FIG. 1 (without a separate chassis) with left wheel assemblies in an extended position;

FIG. 5 shows a side view of the intermodal container of FIG. 1 with left wheel assemblies in a retracted position in hidden lines;

FIG. 6 shows a bottom view of the intermodal container of FIG. 1 with right and left wheel assemblies in an extended position;

FIG. 7 shows a bottom view of the intermodal container of FIG. 1 with right and left wheel assemblies in the retracted position and a first pair of left and right tires concealed by a cover as indicated by dashed lines;

FIG. 8 shows a simplified schematic of a wheel assembly according to one embodiment in an extended position, the wheel assembly having retractable gear, an inboard coupling, and a retaining coupling;

FIG. 9 shows a simplified schematic of the wheel assembly of FIG. 8 in a retracted position;

DETAILED DESCRIPTION

The offloading of intermodal freight containers from a train is typically performed using a crane such as a gantry crane that straddles the train and road equipment. One-by-one, the crane lifts the intermodal containers from the train and places them onto separate chassis. In order to ensure efficient offloading of the train, a chassis must be available for each container as the container is offloaded from the train. However, there is often a shortage of chassis due to lack of inventory and inventory control issues. As a result, some containers must be placed on the ground, and later lifted using a side-loader crane, such as a fork lift, onto a chassis when a chassis becomes available. This can result in significant delays in transporting the containers to their final destinations.

Figure 1:
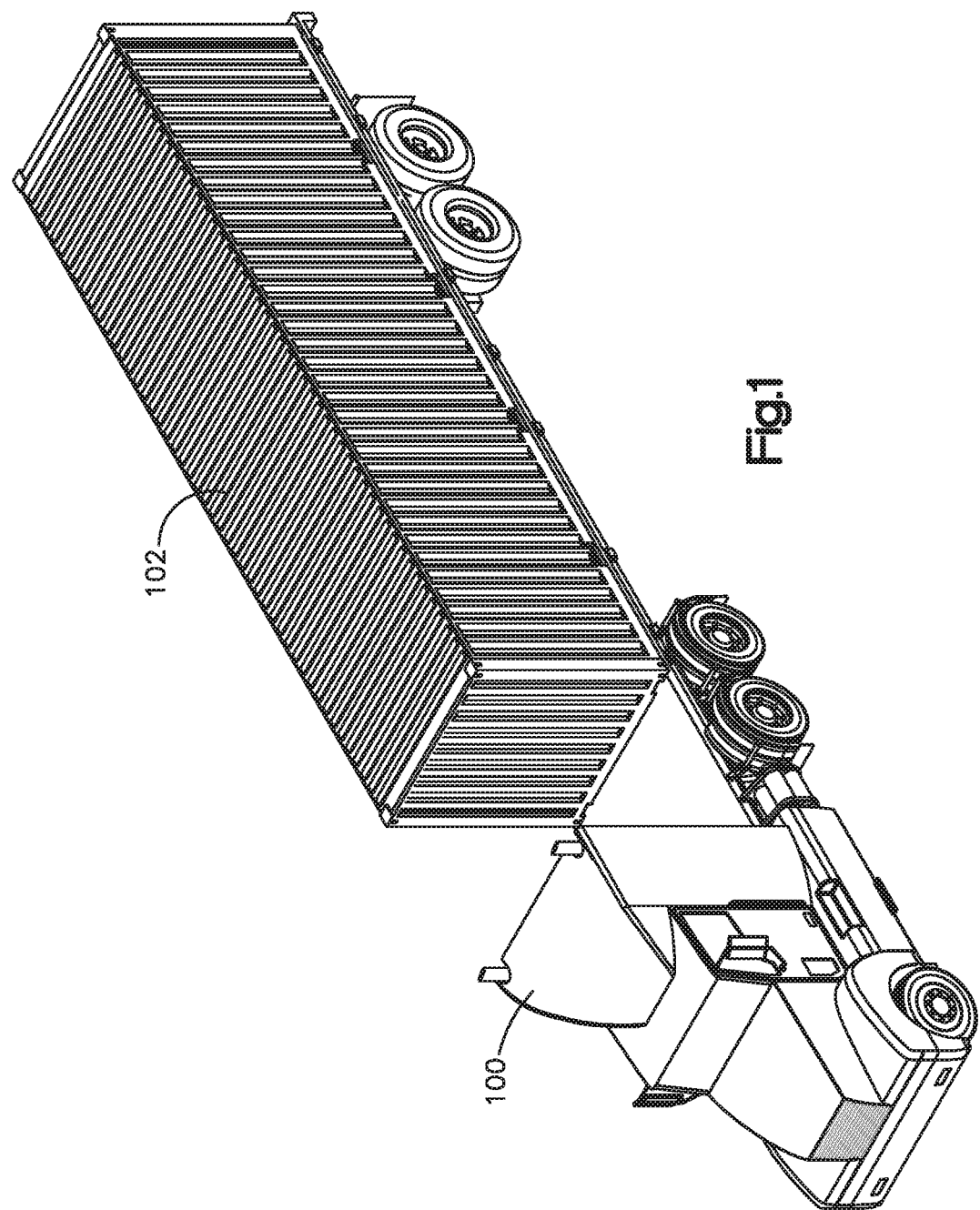
FIG. 1 shows a perspective view of a trucking system comprising an intermodal container and tractor unit according to one embodiment, with wheel assemblies in their extended or operational position.

As shown in FIG. 1, a trucking system can comprise a tractor unit 100 and an intermodal freight container 102, where the container 102 has the capability of being pulled by the tractor unit 100 across roads at a conventional road speed such that a separate chassis is not needed to carry the container 102, as explained more fully below. FIG. 1 illustrates the trucking system having two sets of axles (that is, eight wheels at the rear), while other figures show three sets of axles (that is, twelve wheels at the rear), as the invention is not limited to any particular number of wheel assemblies. In this regard, at least a portion of the chassis can be retractable into the container 102 such that the container 102 with retracted components can be loaded onto a train car or ship. When at least a portion of the components is retracted into the container 102, the footprint and height of the container 102 preferably are the same as those of a conventional intermodal container that is devoid of a chassis. Thus, the container 102 can be transported by train car or ship in a like manner to comparable intermodal containers, such as stacked with other containers 102 and/or (preferably) conventional intermodal containers, and can also be pulled by a tractor unit over roads without needing a separate chassis.

Referring to FIGS. 2-7, in general, the intermodal freight container 102 comprises a metal box 103 that is generally rectangular or any suitable exterior shape as desired. The metal box 103 includes a front wall 104, a rear wall or door 106 opposite the front wall 104 along a longitudinal direction L, first and second sidewalls 108 and 110 that oppose one another along a lateral direction A, a top wall 112, a bottom wall 114 that opposes the top wall 112 along a vertical direction V, and a structural frame 116, where the longitudinal, lateral, and vertical directions are perpendicular to one another. The container 102 further comprises at least one left wheel assembly 118 and at least one right wheel assembly 120 spaced from one another along the lateral direction A. For example, the container can comprise between one and three left wheel assemblies 118 and between one and three right wheel assemblies 120. Each one of the left and right wheel assemblies 118 and 120 includes an axle 122 and at least one tire 124, such as a pair of tires 124 as shown in the figures, mounted on the axle 122. Further, the left and right wheel assemblies 118 and 120 are movable between (i) an extended position in which the tires 124 extend below the first and second sidewalls 108 and 110 in the vertical direction V so as to be engageable with a ground surface, and (ii) a retracted position in which the first and second sidewalls 108 and 110 extend into a cavity such that sidewalls 108 and 110 extend below the tires 124 along the vertical direction V.

Referring more specifically to the metal box 103, the front wall 104 defines a front end of the intermodal container 102, and the rear wall or rear door 106 at least partially defines a rear end of the intermodal container 102. The front wall 104 defines a first exterior end surface 104a, and the rear door 106 defines a second exterior end surface 106a. The first and second side walls 108 and 110 define first and second sides of the intermodal container 102. The first and second side walls 108 and 110 extend below the bottom wall 114 along the vertical direction V. The first side wall 108 defines a first exterior side surface 108a, and the second side wall 110 defines a second exterior side surface 110a. Similarly, the top wall 112 defines an exterior top surface 112a, and the bottom wall 114 defines an exterior bottom surface 114a. It should be appreciated that the exterior surfaces of the intermodal container 102 combine to define a generally rectangular exterior shape, or any suitable alternative exterior shape as desired.

The intermodal container 102 can be constructed and dimensioned as an international standards organization (ISO) shipping container such as (without limitation) a twenty-foot equivalent unit (TEU) container, a forty-foot equivalent unit (FEU) container, a 45-foot container, a 48-foot container, or a 53-foot container. Further, the container 102 can include a plurality of twist locks 115 disposed at corners of the container 102, the twist locks 115 configured to interlock a plurality of the containers 102 to one another, and interlock the containers 102 to other structure such as to a train car. It will be understood that, in alternative embodiments, the intermodal container 102 may be any other suitable intermodal shipping container having any suitable size and any suitable shape for carrying cargo.

The intermodal container 102 defines an internal cavity or cargo bay 126. For example, the intermodal container 102 defines interior surfaces opposite the exterior surfaces. In particular, the front wall 104 defines a first interior end surface 104b, and the rear door 106 defines a second exterior end surface 106b. Similarly, the first side wall 108 defines a first interior side surface 108b, and the second side wall 110 defines a second interior side surface 110b. Similarly, the top wall 112 defines an interior top surface 112b, and the bottom wall 114 defines an interior bottom surface 114b. The interior top surface 112b can define a ceiling of the internal cavity 126. The interior bottom surface 114b of the bottom wall 114 can define a floor of the internal cavity 126. Thus, it should be appreciated that the interior surfaces of the intermodal container 102 combine to define the internal cavity 126, which can be entirely enclosed, or can be open to the external ambient environment as desired.

The intermodal container 102 defines a cavity or recess 128 configured to house at least a portion of the left and right wheel assemblies 118 and 120. In particular, the exterior bottom surface 114a, a portion of the first interior side surface 108b below exterior bottom surface 114a, and a portion of the second interior side surface 110b below the exterior bottom surface 114a can at least partially define the recess 128. Preferably, the recess 128 can fully house the left and right wheel assemblies 118 and 120 in the retracted position, and house a portion of the left and right wheel assemblies 118 and 120 in the extended position.

The structural frame 116 includes at least one inboard structural steel shape 130 that supports the bottom wall 114. For convenience, the broad term "beam" will be used to refer to an any structural shape, such as an I-beam, web, angle, channel, T, and the like. Preferably, a pair of inboard beams 130 are substantially parallel to one another. Each inboard beam 130 extends along the longitudinal direction L and is disposed between the first sidewall 108 and the second sidewall 110. For example, a pair of the inboard beams 130 can be substantially centered between the first and second sidewalls 108 and 110. Each inboard beam 130 can be implemented as any suitable structural beam such as (without limitation) an I-beam. Further, each inboard beam 130 can be disposed between the left and right wheel assemblies 118 and 120 with respect to the lateral direction A.

The structural frame 116 can further include at least one cross beam 131 that supports the bottom wall 114, such as a pair of cross beams 131. Each cross beam 131 extends along the lateral direction A between the first and second sidewalls 108 and 110. For example, each cross beam 131 can extend along the lateral direction A from the first sidewall 108 to the second sidewall 110. Further, each cross beam 131 can be fixedly attached to the at least one inboard beam 130, such as to a pair of the inboard beams 130 so as to maintain the spacing between the inboard beams 130.

In some embodiments, the structural frame 116 can further include at least one outboard beam 133 that supports the bottom wall 114, such as a pair of outboard beams 133 that are substantially parallel to one another (as for example, shown in FIGS. 6 and 7). Each outboard beam 133 extends along the longitudinal direction L and can also support a respective one of the first sidewall 108 and the second sidewall 110. For example, a pair of the outboard beams 133 can support the first and second sidewalls 108 and 110. The left and right wheel assemblies 118 and 120 can be disposed between a pair of the outboard beams 133 with respect to the lateral direction A.

Referring more specifically to the left and right wheel assemblies 118 and 120, each wheel assembly includes at least one tire 124 mounted onto a corresponding rim 125, such as a pair of tires 124 mounted on a pair of rims 125. Each of the left and right wheel assemblies 118 and 120 can further include at least one of a brake assembly (not shown) configured to stop the wheel assembly from rotating and a suspension (not shown) configured to limit vibration of the metal box 103 as the tire 124 travels over uneven surfaces. Each of the tires 124 has a pair of sidewalls 124a and 124b, and a tread 124c that extends between the pair of sidewalls 124a and 124b. The pair of sidewalls 124a and 124b oppose one another along the lateral direction A when in the extended position. Further, the pair of sidewalls 124a and 124b oppose one another along the vertical direction V when in the retracted position. Thus, the tires 124 can be rotated about the longitudinal direction L between the extended position and the retracted position.

Each one of the left and right wheel assemblies 118 and 120 includes an axle 122 and at least one of the tires 124, such as a pair of tires 124, mounted on the axle 122. Each axle 122 defines a shaft that extends along an axle central axis A. In some embodiments, each axle 122 can be a non-rotating shaft that does not rotate about the axle central axis A. For example, each of wheel assemblies of the left and right wheel assemblies 118 and 120 can include a wheel bearing (e.g., 123 in FIGS. 8 and 9) that enables the tire 124 and rim 125 to rotate about the axle central axis A relative to the axle 122 while the axle 122 is rotationally fixed. In other embodiments, each axle 122 can be a rotating shaft that freely rotates about the axle central axis A in response to the intermodal container 102 being pulled along a ground surface. For example, each of the left and right wheel assemblies 118 and 120 can include an axle bearing (e.g., 127 in FIGS. 8 and 9) that enables the axle 122 to rotate about the axle central axis A. In yet other embodiments, each axle 122 can be a rotating shaft that rotates about the axle central axis A in response to a force imposed on the axle 122 by a drive shaft (not shown) that is driven by an engine or motor.

Each axle 122 includes an axle outboard end 122a and an axle inboard end 122b. Further, each axle 122 extends from the axle outboard end 122a to the axle inboard end 122b along the axle central axis A. The axle central axis A extends along the lateral direction A when in the extended position. Further, the axle central axis A can extend along the vertical direction V when in the retracted position. Thus, each axle 122 can be rotated about the longitudinal direction L between the extended position and the retracted position. In other words, each axle 122 can be rotated in a plane that extends in the vertical direction V and lateral direction A. Moreover, in at least some such alternative embodiments, each pair of left and right wheel assemblies 118 and 120 can include a single, shared axle that supports the tires 124 of the both the left and right wheel assembles 118 and 120.

Turning to FIGS. 8 and 9, the intermodal container 102 includes, for each of the left and right wheel assemblies 118 and 120, retractable gear 132 that is supported by the structural frame 116 and configured to transition a respective one of the left and right wheel assemblies 118 and 120 between the retracted and extended positions. In some embodiments, as schematically shown in FIGS. 8 and 9, the retractable gear 132 can include a linkage 134 having at least first and second pivoting arms 136 and 138 configured to guide a respective one of the left and right wheel assemblies 118 and 120 between the extended position and the retracted position.

The first arm 136 can be connected to the structural frame 116, such as to one of the inboard beams 130 or other structural component. The first arm 136 can have a first end 136a and a second end 136b spaced from the first end 136a. The first end 136a can be connected to the structural frame 116 indirectly, such as through a coupler 140 or other component attached to the structural frame 116. Alternatively, the first end 136a can be connected directly to the structural frame 116 with no intervening components between the first end 136a and the structural frame 116. Further, the first end 136a can be pivotally connected to the structural frame 116 such that the first arm 136 pivots relative to the structural frame 116 about a pivot point at the first end 136a. Alternatively, the first end 136a can be fixedly connected to the structural frame 116 such that the first arm 136 does not pivot relative to the structural frame 116.

The second arm 138 can be connected to a respective one of the wheel assemblies 118 or 120, such as to the (preferably, non-rotating) axle 122 of the respective one of the wheel assemblies 118 or 120. The second arm 138 can have a first end 138a and a second end 138b spaced from the first end 138a. The first end 138a can be connected to the respective one of the wheel assemblies 118 or 120 indirectly, such as through a coupler 142. In embodiments in which the axle 122 rotates, the coupler 142 can be configured such that the axle 122 rotates within the coupler 142. In alternative embodiments, the first end 138a can be connected directly to the respective one of the wheel assemblies 118 or 120 with no intervening components between the first end 138a and the respective one of the wheel assemblies 118 or 120. Further, the first end 138a can be pivotally connected to the respective one of the wheel assemblies 118 or 120 such that the second arm 138 pivots relative to the respective one of the wheel assemblies 118 or 120 at pivot point at the first end 138a. Alternatively, the first end 138a can be fixedly connected to the respective one of the wheel assemblies 118 or 120 such that the second arm 138 does not pivot relative to the respective one of the wheel assemblies 118 or 120. The second end 138a of the second arm 138 can be pivotally connected to the second end 136a of the first arm 136 such that the first and second arms 136 and 138 pivot relative to one another.

The left and right wheel assemblies 118 and 120 can be transitioned between the retracted and extended positions using any suitable actuator or actuators. For example, each actuator can include (without limitation) a mechanical actuator, hydraulic, pneumatic, or electro-mechanical actuator, or combinations thereof. A mechanical actuator can motorized and/or can be actuated using, for example, a hand crank. The actuator can be configured to act on the linkage such as on one of the first and second arms 136 and 138 so as to cause the first and second arms 136 and 138 to move relative to one another, as will be understood by persons familiar with mechanical linkage design and operation.

With continued reference to FIGS. 8 and 9, the intermodal container 102 can include, for each respective wheel assembly of the left and right wheel assemblies 118 and 120, an inboard axle coupling 140 supported by the structural frame 116. Additionally, the intermodal container 102 can optionally include an outboard axle coupling (shown in dashed lines) for each axle outboard end 122a as will be described in further detail below in relation to FIG. 10. Each inboard axle coupling 140 is configured to releasably couple the axle inboard end 122b of the respective wheel assembly to the structural frame 116 when the respective wheel assembly is in the extended position. Each inboard axle coupling 140 can include a sleeve 144 that receives the axle inboard end 122b of a respective one of the left and right wheel assemblies 118 and 120. In embodiments in which the axles 122 rotate, the inboard axle couplings 140 can permit the axles 122 to rotate therein. For example, the inboard axle couplings 140 can include axle bearings 127 that permit the axles 122 to rotate. In embodiments in which the axles 122 do not rotate, the inboard axle couplings 140 can be devoid of the axle bearings 127, and instead, each of the left and right wheel assemblies 118 and 120 can include a wheel bearing 123 that permits the tires 124 to rotate while the axles 122 remain rotationally fixed.

In addition or alternatively, the structural frame 116 can include openings 146, each of which receives a respective one of the axle inboard ends 122b. Each axle inboard end 122b can be locked to the structural frame 116 by, for example, a locking pin 148 that extends radially through the axle inboard end 122b. Each locking pin 148 can prevent a respective one of the axles 122 from translating along the lateral direction A and from decoupling from the corresponding inboard axle coupling 140. Further, each locking pin 148 can permit rotation of the respective one of the axles 122 if rotation of the axle 122 is desired. It will be understood that the axle inboard end 122b can be coupled to the structural frame 116 using other suitable couplings, as will be understood by persons familiar with rotating equipment and related technology.

With continued reference to FIGS. 8 and 9, the freight container 102 can include, for each of the left and right wheel assemblies 118 and 120, and a retaining coupling 160 that is configured to lock the wheel assembly in the retracted position. The retaining coupling 160 can be supported by the metal box 103 or structural frame 116. In one embodiment, as shown, the retaining coupling 160 can be configured to receive the an axle 122 of a corresponding one of the right and left wheel assemblies 118 and 120 so as to lock the axle 122 in the retracted position. The retaining coupling 160 can be supported by the interior bottom surface 114b of the bottom wall 114 as shown such that the axle 122 extends through an opening 162 in the bottom wall 114 into the coupling 160. Alternatively, the retaining coupling 160 can be supported by the exterior bottom surface 114a such that the axle 122 does or does not pass through the bottom wall 114. In such embodiments, the axle 122 may or may not extend through the bottom wall 114. In other embodiments, the axle 122 can include a retaining arm (not shown) that extends away from the axle central axis A, and that is configured to be received by a retaining coupling so as to lock the axle 122 in the retracted position.

Figure 10:
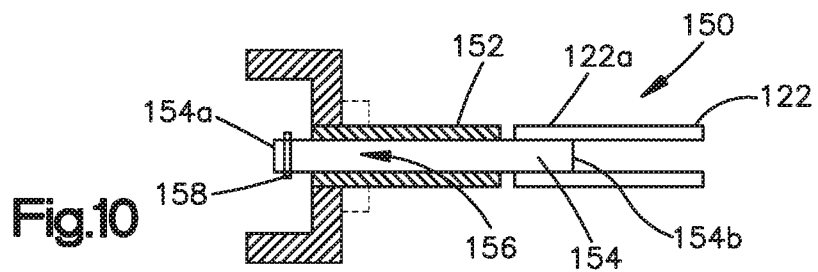
FIG. 10 shows a simplified schematic of an outboard coupling according to one embodiment.

Referring to FIG. 10, the intermodal container can comprise, for each respective wheel assembly of the left and right wheel assemblies 118 and 120, an outboard axle coupling 150. Each outboard axle coupling 150 can be supported by the metal box 103 or the structural frame 116, such as by an outboard beam 133. Each outboard axle coupling 150 can be configured to releasably couple to the axle outboard end 122a of a respective one of the left and right wheel assemblies 118 and 120 when the respective wheel assembly is in the extended position. Each outboard axle coupling 150 can include a sleeve 152 configured to couple to a respective one of the axles 122 therein. In some embodiments, the intermodal container 102 can include, for each of the left and right wheel assemblies 118 and 120, an extendable shaft 154 that is configured to extend from one of a corresponding axle 122 and a corresponding sleeve 152 to the other of the corresponding axle 122 and a corresponding sleeve 152. For example, each axle 122 can include an extendable shaft 154 having a shaft outboard end 145a and a shaft inboard end 154b. The shaft inboard end 145b can extend into an axle outboard end 122a of a corresponding axle 122. The shaft outboard end 145a can extend into the sleeve 152 of a corresponding outboard axle coupling 150. Thus, the extendable shaft 145 can extend from a corresponding axle 122 and into a corresponding sleeve 152 in a telescoping manner so as to lock the axle 122 to the outboard axle coupling 150. Further, the extendable shaft 145 can retract into the axle 122 and disengage the corresponding sleeve 152 in a telescoping manner so as to unlock the axle 122 from the outboard axle coupling 150.

In addition or alternatively, the metal box 103 or structural frame 116 can include openings 156, each of which receives a shaft outboard end 154a of a corresponding one of the extendable shafts 154. Each shaft outboard end 154a can be locked to the structural frame 116 by, for example, a locking pin 158 that extends radially through the shaft outboard end 154a. Each locking pin 158 can prevent a respective one of the extendable shafts 154 from translating along the lateral direction A and from decoupling from the corresponding outboard axle coupling 150. Further, each locking pin 158 can permit rotation of the respective one of the extendable shafts 154 (and hence the corresponding axle 122) if rotation of the axle 122 is desired. It will be understood that the axle outboard end 122a can be coupled to the structural frame 116 using other suitable couplings.

Referring back to FIG. 7, in some embodiments, the container 102 can include a cover 164, which is shown partially retracted over a first pair of left and right wheel assemblies 118 and 120. The cover 164 can be attached to the metal box 103 and can be configured to conceal the wheel assemblies 118 and 120 and protect them from damage or debris when the wheel assembles are in the retracted position such that the wheel assemblies 118 and 120 are disposed between the cover 164 and the bottom wall 114. The cover 164 can be configured to slide or translate over the cavity 128 that houses the wheel assemblies 118 and 120 along the longitudinal direction L, or can be otherwise configured.

Turning again to FIGS. 4-7, the container 102 can include at least one retractable leg 117 that can be transitioned between a retracted leg position and an extended leg position. In the extended leg position, the retractable leg 117 can extend from the bottom of the container 102 to the ground as shown in FIG. 4 when the wheel assemblies 118 and 120 are in the extended position and the container 102 is not coupled to a tractor unit. Further, in the retracted leg position, the retractable leg 117 can retract into the recess 128 in the bottom of the container 102 such that the retractable leg 117 extends along the longitudinal direction L when the wheel assemblies 118 and 120 are in the retracted position and the container 102 is in transit via train car or ship. The container 102 can further include a king pin 119 (FIGS. 6 and 7) that is supported by the metal box 103, and that is configured to interlock with a fifth wheel coupling of the tractor unit 100 so as to couple the container 102 to the tractor unit 100. For example, the king pin 119 can be supported by the structural frame 116 and can extend from the structural frame 116 downward in the vertical direction V.

Figure 11:
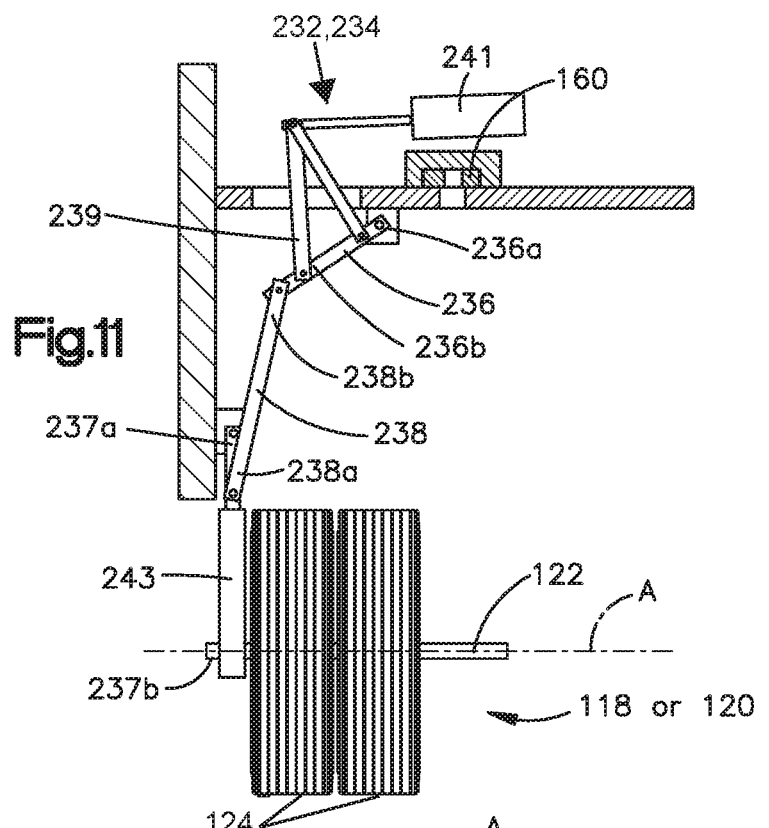
FIG. 11 shows a simplified schematic of a wheel assembly according to another embodiment in an extended position, the wheel assembly having retractable gear and a retaining coupling.
Figure 12:
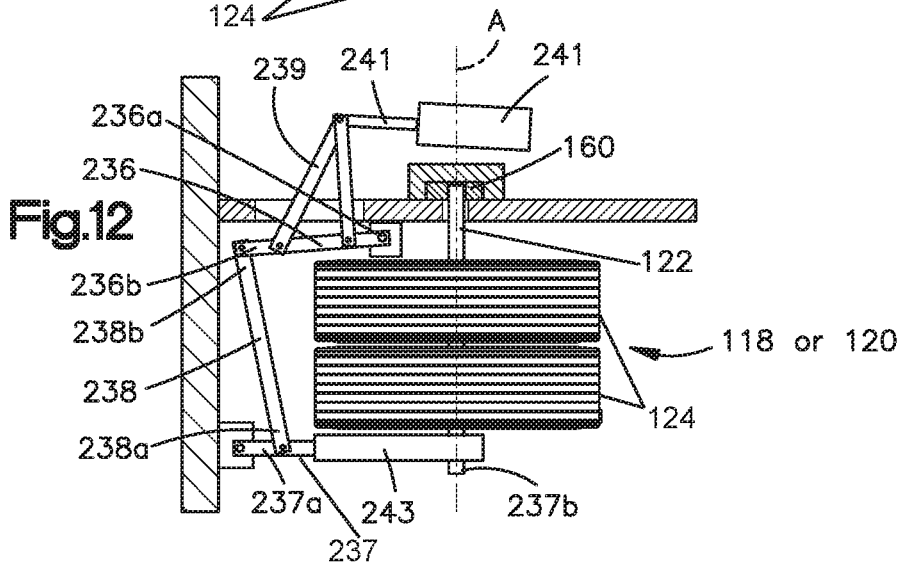
FIG. 12 shows a simplified schematic of the wheel assembly of FIG. 11 in a retracted position.

Turning now to FIGS. 11 and 12, alternative retractable gear 232 is schematically shown. In this embodiment, the retractable gear 232 is configured in a manner similar to landing gear on an aircraft. The retractable gear 232 can be supported by at least one of the structural frame 116 and the metal box 103. The retractable gear 232 can be configured to transition a respective one of the left and right wheel assemblies 118 and 120 between the retracted and extended positions. The retractable gear 232 can include a linkage 234 having at least first and second pivoting arms 236 and 238 configured to guide a respective one of the left and right wheel assemblies 118 and 120 between the extended position and the retracted position. The linkage 234 can also include a swing arm 237 configured to swing a respective one of the left and right wheel assemblies 118 and 120 between the extended position and the retracted position in response to relative pivoting between the first and second pivoting arms 236 and 238.

The swing arm 237 can have a first end 237a and a second end 237b spaced from the first end 237a. The second end 237b can be attached to a respective one of the left and right wheel assemblies 118 and 120, such as to the axle 122 of the respective one of the left and right wheel assemblies 118 and 120. The first end 237a can be pivotally connected to the structural frame 116 or metal box 103 such that the swing arm 237 pivots relative to the structural frame 116 or metal box 103 about a pivot point at the first end 237a. In some embodiments, the swing arm 237 can be configured to change in length between the first and second ends 237a and 237b when the respective one of the left and right wheel assemblies 118 and 120 is transitioned between the extended and retracted positions. For example, the swing arm 237 can include an actuator 243 that changes in length. The actuator 243 can be (without limitation) a (motorized and/or manual) mechanical actuator, a hydraulic actuator, a pneumatic actuator, or an electro-mechanical actuator, or a combination thereof.

The first arm 236 can have a first end 236a and a second end 236b spaced from the first end 236a. The first end 236a can be pivotally connected to the structural frame 116 or metal box 103 such that the first arm 236 pivots relative to the structural frame 116 or metal box 103 about a pivot point at the first end 236a. The second arm 238 can have a first end 238a and a second end 238b spaced from the first end 238a. The first end 238a can be pivotally connected to the swing arm 237, and the second end 238b can be pivotally connected to the first arm 236. The retractable gearing 232 can further include an actuator 241 supported by one of the structural from and metal box 103, and at least one strut 239 that connects the actuator 241 to at least one of the first and second arms 236 and 238. The actuator 241 can be (without limitation) a mechanical actuator, a hydraulic actuator, a pneumatic actuator, or an electro-mechanical actuator, or a combination thereof. In this example, the respective one of the left and right wheel assemblies 118 and 120 transitions to the extended position when the actuator 241 extends, and transitions to the retracted position when the actuator 241 retracts. However, it will be understood that the actuator 241 can be positioned such that the respective one of the left and right wheel assemblies 118 and 120 transitions to the extended position when the actuator 241 retracts, and transitions to the retracted position when the actuator 241 extends. As described above, the container 102 can include a wheel bearing that permits the tire 124 to rotate in embodiments in which the axle 122 is rotationally fixed, an axle bearing that permits the axle 122 to rotate, or a drive shaft that drives the axle 122 to rotate.

In use, a method of transporting the container 102 comprises transitioning the left and right wheel assemblies 118 and 120 of the intermodal freight container 102 (i) from an extended position in which tires 124 of the left and right wheel assemblies 118 and 120 extend below the first and second sidewalls 108 and 110 of the intermodal freight container 102 in a vertical direction V so as to engage the ground surface (ii) to a retracted position in which the first and second sidewalls 108 and 110 extend below the tires 124 along the vertical direction V. Optionally, cover 164 is translated to cover and protect the wheel assemblies. The intermodal freight container 102 is stacked on one of a train car and a ship with the left and right wheel assemblies 118 and 120 in the retracted position. The intermodal freight container 102 is then transported on the one of the train car and the ship to a destination.

The method can additionally or alternatively comprise transitioning the left and right wheel assemblies 118 and 120 from the retracted position to the extended position and transferring the intermodal freight container 102 from one of a train car and a ship to a ground surface. Further, the intermodal freight container 102 is coupled to a tractor unit 100 configured to pull the intermodal freight container 102 by conventional methods.

The method can additionally or alternatively comprise decoupling the intermodal freight container 102 from the tractor unit 100, transitioning the left and right wheel assemblies 118 and 120 of the intermodal freight container 102 from the extended position to the retracted position, and stacking the intermodal freight container 102 with the left and right wheel assemblies 118 and 120 in the retracted position onto one of a train car and a ship.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims are recited in a particular sequence with corresponding labeling, unless the claim recitations otherwise imply a particular sequence for implementing some or all of those elements, those elements are not necessarily intended to be limited to being implemented in that particular sequence.

What is claimed:

1. An intermodal freight container, comprising:
a rectangular metal box including a front wall, a rear door opposite the front wall along a longitudinal direction, first and second sidewalls that oppose one another along a lateral direction, a top wall, a bottom wall that opposes the top wall along a vertical direction, and a structural frame, the longitudinal, lateral, and vertical directions being perpendicular to one another;
left and right wheel assemblies spaced from one another along the lateral direction, each one of the left and right wheel assemblies including:
an axle including an outboard end and an inboard end, at least one of the outboard end and the inboard end configured to be releasably coupled to an axle coupling that is supported by a portion of the structural frame; and
a pair of tires mounted on the axle; and
a linkage supported by the structural frame and connected to each of the left and right wheel assemblies, each linkage comprising at least two pivoting arms configured to guide a respective one of the left and right wheel assemblies between (i) an extended position in which the respective wheel assembly is coupled to a corresponding one of the axle couplings and the pair of tires of the respective wheel assembly extend beyond the first and second sidewalls in the vertical direction so as to be engageable with a ground surface, and (ii) a retracted position in which the respective wheel assembly is decoupled from the corresponding one of the axle couplings and the first and second sidewalls extend beyond the pair of tires of the respective wheel assembly along the vertical direction.

2. The intermodal freight container of claim 1, wherein each of the tires has a pair of sidewalls, and a tread that extends between the pair of sidewalls, and wherein the pair of sidewalls oppose one another along the lateral direction when in the extended position and oppose one another along the vertical direction when in the retracted position.

3. The container of claim 1, comprising a cover attached to the metal box, the cover configured to conceal the left and right wheel assemblies when the left and right wheel assembles are in the retracted position such that the left and right wheel assemblies are disposed between the cover and the bottom wall.

4. An intermodal freight container, comprising:
a rectangular metal box including a front wall, a rear door opposite the front wall along a longitudinal direction, first and second sidewalls that oppose one another along a lateral direction, a top wall, a bottom wall that opposes the top wall along a vertical direction, and a structural frame, the longitudinal, lateral, and vertical directions being perpendicular to one another;
left and right wheel assemblies spaced from one another along the lateral direction, each one of the left and right wheel assemblies including an axle and at least one tire mounted on the axle, wherein the left and right wheel assemblies are movable between an extended position in which the tires extend below the first and second sidewalk in the vertical direction so as to be engageable with a ground surface, and a retracted position in which the first and second sidewalls extend below the tires along the vertical direction; and
retractable gear for each of the left and right wheel assemblies, the retractable gear supported by the structural frame and configured to transition a respective one of the left and tight wheel assemblies between the extended position and the retracted position, wherein the retractable gear includes at least one actuator configured to transition the respective one of the left and right wheel assemblies between the extended and retracted positions.

5. The intermodal freight container of claim 4, wherein the first and second sidewalls extend below the bottom wall along the vertical direction so as to define a recess below the bottom wall and between the first and second sidewalls, the recess configured to house the left and right wheel assemblies.

6. The intermodal freight container of claim 4, wherein each of the tires has a pair of sidewalls, and a tread that extends between the pair of sidewalls, and wherein the pair of sidewalls oppose one another along the lateral direction when in the extended position and oppose one another along the vertical direction when in the retracted position.

7. The intermodal freight container of claim 4, wherein each retractable gear comprises a linkage having at least two pivoting arms configured to guide the respective one of the left and right wheel assemblies between the extended position and the retracted position.

8. The intermodal freight container of claim 4, comprising a cover attached to the metal box, the cover configured to conceal the left and right wheel assemblies when the left and right wheel assembles are in the retracted position such that the left and right wheel assemblies are disposed between the cover and the bottom wall.

9. The intermodal freight container of claim 4, comprising, for each respective wheel assembly of the left and right wheel assemblies, an inboard axle coupling supported by the structural frame, the inboard axle coupling configured to releasably couple to the inboard end of the axle of the respective wheel assembly when the respective wheel assembly is in the extended position.

10. An intermodal freight container, comprising:
a rectangular metal box including a front wall, a rear door opposite the front wall along a longitudinal direction, first and second sidewalls that oppose one another along a lateral direction, a top wall, a bottom wall that opposes the top wall along a vertical direction, and a structural frame, the longitudinal, lateral, and vertical directions being perpendicular to one another; and
left and right wheel assemblies spaced from one another along the lateral direction, each one of the left and right wheel assemblies including an axle and at least one tire mounted on the axle, wherein the left and right wheel assemblies are movable between an extended position in which the tires extend below the first and second sidewalk in the vertical direction so as to be engageable with a ground surface, and a retracted position in which the first and second sidewalk extend below the tires along the vertical direction; and
an outboard axle coupling for each respective wheel assembly of the left and right wheel assemblies, each outboard axle coupling supported by the structural frame and configured to releasably couple to the outboard end of the axle of the respective wheel assembly when the respective wheel assembly is in the extended position.

11. The intermodal freight container of claim 10, wherein each outboard axle coupling includes a locking pin to retain the outboard end of a respective one of the axles in the outboard axle coupling.

12. The intermodal freight container of claim 10, wherein each outboard axle coupling includes a sleeve configured to hold the outboard end of a respective one of the axles.

13. The intermodal freight container of claim 10, wherein an axle outboard end of each of the axles includes an extendible shaft configured to be received by the outboard axle coupling.

14. The intermodal freight container of claim 11, wherein each extendible shaft has a telescoping configuration.

15. The intermodal freight container of claim 4, wherein the axle is configured to be locked in a retaining coupling when the left and right wheel assemblies are in the retracted position.

16. A method of transporting an intermodal freight container, the method comprising steps of:
(a) transitioning left and right wheel assemblies of the intermodal freight container (i) from an extended position in which tires of the left and right wheel assemblies extend below first and second sidewalls of the intermodal freight container in a vertical direction so as to be engageable with a ground surface (ii) to a retracted position in which the first and second sidewalls extend below the tires along the vertical direction; and
(b) stacking the intermodal freight container on one of a train car and a ship with the left and right wheel assemblies in the retracted position for transportation to a destination,
wherein step (a) comprises actuating, for each of the left and right wheel assemblies, at least one actuator of a retractable gear of the intermodal freight container so as to transition a respective one of the left and right wheel assemblies between the extended position and the retracted position.

17. The method of claim 16, comprising, before or after step (a):
(1) transitioning the left and right wheel assemblies from the retracted position to the extended position at the destination and transferring the intermodal freight container from the one of the train car and the ship to a ground surface; and (2) coupling the intermodal freight container to a tractor unit configured to pull the intermodal freight container.

18. The method of claim 17, comprising (3) decoupling the intermodal freight container from the tractor unit.

19. An intermodal freight container, comprising:
a rectangular metal box including a front wall, a rear door opposite the front wall along a longitudinal direction, first and second sidewalls that oppose one another along a lateral direction, a top wall, a bottom wall that opposes the top wall along a vertical direction, and a structural frame, the longitudinal, lateral, and vertical directions being perpendicular to one another; and
left and right wheel assemblies spaced from one another along the lateral direction, each one of the left and right wheel assemblies including an axle and at least one tire mounted on the axle;
retractable gear for each of the left and right wheel assemblies, the retractable gear supported by the structural frame and configured to transition a respective one of the left and right wheel assemblies between the extended position and the retracted position,
wherein the left and right wheel assemblies are movable between an extended position in which the tires extend below the first and second sidewalls in the vertical direction so as to be engageable with a ground surface, and a retracted position in which the first and second sidewalls extend below the tires along the vertical direction, and
wherein each retractable gear comprises a linkage having at least two pivoting arms configured to guide the respective one of the left and right wheel assemblies between the extended position and the retracted position.

20. An intermodal freight container, comprising:
a rectangular metal box including a front wall, a rear door opposite the front wall along a longitudinal direction, first and second sidewalls that oppose one another along a lateral direction, a top wall, a bottom wall that opposes the top wall along a vertical direction, and a structural frame, the longitudinal, lateral, and vertical directions being perpendicular to one another;
left and right wheel assemblies spaced from one another along the lateral direction, each one of the left and right wheel assemblies including an axle and at least one tire mounted on the axle, wherein the left and right wheel assemblies are movable between an extended position in which the tires extend below the first and second sidewalk in the vertical direction so as to be engageable with a ground surface, and a retracted position in which the first and second sidewalls extend below the tires along the vertical direction; and
a cover attached to the metal box, the cover configured to conceal the left and right wheel assemblies when the left and right wheel assembles are in the retracted position such that the left and right wheel assemblies are disposed between the cover and the bottom wall.

21. An intermodal freight container, comprising:
a rectangular metal box including a front wall, a rear door opposite the front wall along a longitudinal direction, first and second sidewalls that oppose one another along a lateral direction, a top wall, a bottom wall that opposes the top wall along a vertical direction, and a structural frame, the longitudinal, lateral, and vertical directions being perpendicular to one another; and
left and right wheel assemblies spaced from one another along the lateral direction, each one of the left and right wheel assemblies including an axle and at least one tire mounted on the axle, wherein the left and right wheel assemblies are movable between an extended position in which the tires extend below the first and second sidewalls in the vertical direction so as to be engageable with a ground surface, and a retracted position in which the first and second sidewalls extend below the tires along the vertical direction; and
an inboard axle coupling for each respective wheel assembly of the left and right wheel assemblies, the inboard axle coupling supported by the structural frame, the inboard axle coupling configured to releasably couple to the inboard end of the axle of the respective wheel assembly when the respective wheel assembly is in the extended position.

* * * * *